United States Patent
Zhao et al.

(10) Patent No.: US 11,338,507 B2
(45) Date of Patent: May 24, 2022

(54) COALESCING AGENT CONCENTRATIONS AND CONTONE DENSITIES FOR THREE-DIMENSIONAL OBJECTS

(71) Applicant: HEWLETT-PACKARD DEVELOPMENT COMPANY, L.P., Houston, TX (US)

(72) Inventors: Lihua Zhao, Sunnyvale, CA (US); Yan Zhao, Palo Alto, CA (US); Hou T. Ng, Campbell, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 426 days.

(21) Appl. No.: 15/560,422

(22) PCT Filed: May 15, 2015

(86) PCT No.: PCT/US2015/031085
§ 371 (c)(1),
(2) Date: Sep. 21, 2017

(87) PCT Pub. No.: WO2016/186613
PCT Pub. Date: Nov. 24, 2016

(65) Prior Publication Data
US 2018/0065297 A1 Mar. 8, 2018

(51) Int. Cl.
*B29C 64/165* (2017.01)
*B29C 64/386* (2017.01)
(Continued)

(52) U.S. Cl.
CPC .......... *B29C 64/165* (2017.08); *B29C 64/205* (2017.08); *B29C 64/264* (2017.08);
(Continued)

(58) Field of Classification Search
CPC ... B29C 64/165; B29C 64/386; B29C 64/393; B29C 64/336
See application file for complete search history.

(56) References Cited

U.S. PATENT DOCUMENTS 5,204,055 A * 4/1993 Sachs ..................... B28B 1/001
419/2
5,851,465 A 12/1998 Brendt
(Continued)

FOREIGN PATENT DOCUMENTS

CN 1976799 6/2007
CN 103842157 6/2014
(Continued)

OTHER PUBLICATIONS

"Why HP's 3D Printing Technology is Amazing, What the Future Holds, and Where Their Competitors Stand"; Sep. 18, 2014 http://3dprint.com/22033/hp-3d-printing-technology-hpq.

*Primary Examiner* — Jason L Lazorcik
(74) *Attorney, Agent, or Firm* — HP Inc. Patent Department (57) ABSTRACT

In some examples, at least one agent distributor may be to selectively deliver mixtures of coalescing agent and carrier onto portions of a layer of build material at variable coalescing agent concentrations and variable contone densities. A controller may be to control the at least one agent distributor to selectively deliver the mixture to a portion of the layer at a selected coalescing agent concentration and a selected contone density.

20 Claims, 4 Drawing Sheets

(51) Int. Cl.
   *B33Y 10/00* (2015.01)
   *B33Y 30/00* (2015.01)
   *B33Y 50/02* (2015.01)
   *B29C 64/393* (2017.01)
   *B29C 64/264* (2017.01)
   *B29C 64/205* (2017.01)

(52) U.S. Cl.
   CPC .......... *B29C 64/386* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 6,423,255 | B1 | 7/2002 | Hoechsmann |
| 6,989,115 | B2 * | 1/2006 | Russell .................. B33Y 10/00 264/39 |
| 7,958,462 | B2 | 6/2011 | Hashima |
| 8,119,053 | B1 | 2/2012 | Bedal et al. |
| 8,444,903 | B2 | 5/2013 | Lyons |
| 2004/0135276 | A1 * | 7/2004 | Nielsen ................ B29C 64/165 264/40.1 |
| 2004/0183796 | A1 * | 9/2004 | Velde ..................... B29C 64/40 345/419 |
| 2007/0238056 | A1 * | 10/2007 | Baumann ............... B22F 3/008 430/325 |
| 2010/0202001 | A1 | 8/2010 | Miller |
| 2012/0100031 | A1 * | 4/2012 | Ljungblad ......... B23K 15/0086 419/7 |
| 2014/0265034 | A1 | 9/2014 | Dudley |
| 2015/0032242 | A1 | 1/2015 | Schouwenburg et al. |
| 2015/0352639 | A1 * | 12/2015 | Toyserkani ............. B22F 7/002 428/201 |
| 2016/0144573 | A1 * | 5/2016 | Hirata ................... C04B 35/486 428/411.1 |
| 2016/0263828 | A1 * | 9/2016 | Ederer ................. B29C 64/295 |
| 2016/0332373 | A1 * | 11/2016 | Kuhn .................... B29C 64/165 |
| 2017/0015065 | A1 * | 1/2017 | Potter ................... B29C 70/882 |

FOREIGN PATENT DOCUMENTS

| | | |
|---|---|---|
| EP | 1442870 | 8/2004 |
| TW | I261029 | 9/2006 |
| WO | WO-2005105412 | 11/2005 |
| WO | WO-2013021173 | 2/2013 |
| WO | WO-2013136096 | 9/2013 |
| WO | WO-2015106816 A1 | 7/2015 |

* cited by examiner

COALESCING AGENT CONCENTRATIONS AND CONTONE DENSITIES FOR THREE-DIMENSIONAL OBJECTS

BACKGROUND

Additive manufacturing systems that generate three-dimensional objects on a layer-by-layer basis have been proposed as a potentially convenient way to produce three-dimensional objects. The quality of objects produced by such systems may vary widely depending on the type of additive manufacturing technology used.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." For example, "an agent distributor" means "one or more agent distributors." The terms "including" and "having" are intended to have the same inclusive meaning as the term "comprising."

Some additive manufacturing systems generate three-dimensional objects through the solidification of portions of successive layers of build material, such as a powdered or liquid build material. The properties of generated objects may be dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent (i.e. a fusing agent), which is a material that, when a suitable amount of energy is applied to a combination of build material and coalescing agent, may cause the build material to coalesce and solidify. For example, the coalescing agent may act as an absorber of applied energy such that the portions of build material having coalescing agent experience coalescence and solidification. In some examples, a multiple agent additive manufacturing system may be used such as that described in PCT Application No. PCT/EP2014/050841 filed on Jan. 16, 2014, entitled "GENERATING A THREE-DIMENSIONAL OBJECT", the entire contents of which are hereby incorporated herein by reference. For example, in addition to selectively delivering coalescing agent to layers of build material, coalescence modifier agent may also be selectively delivered to layers of build material. A coalescence modifier agent (i.e. a detailing agent) may serve to modify the degree of coalescence of a portion of build material on which the coalescence modifier agent has been delivered or has penetrated. In yet other examples, other methods of solidification may be used, for example selective laser sintering (SLS), light polymerization, among others. The examples described herein may be used with any of the above additive manufacturing systems and suitable adaptations thereof.

In some examples, mixtures of coalescing agent and carrier (e.g. a carrier fluid) may be selectively delivered to build material. In such examples, the degree of coalescence and solidification achieved in the three-dimensional object may depend on an amount of coalescing agent and the amount of carrier delivered to the build material. The coalescing agent may contribute to increasing the degree of coalescence and solidification of build material e.g. by increasing absorption of energy applied by the energy source. Meanwhile, while the carrier may contribute to decreasing the degree of coalescence and solidification e.g. due to a cooling effect of the carrier. For example, the carrier may cool the build material by evaporative cooling or another mechanism.

Accordingly, the present disclosure provides examples for controlling the concentration, by mass, of coalescing agent in the delivered mixture, as well as the contone density of the delivered mixture. A contone density is a density of drops delivered across an area of build material. Thus, a coalescing agent loading and a fluid loading may also be controlled. "Coalescing agent loading" is a product of a coalescing agent concentration and of a contone density (i.e. coalescing agent concentration×contone density). "Fluid loading" is a product of a contone density and of the percentage by mass of each drop that includes coalescing agent (i.e. contone density×[1−coalescing agent concentration]). By controlling any of the foregoing parameters, target object properties, e.g. object density, mechanical strength, color, or thermal properties (e.g. heating and cooling effects while generating the object) may be controlled, for example.

Figure 1:
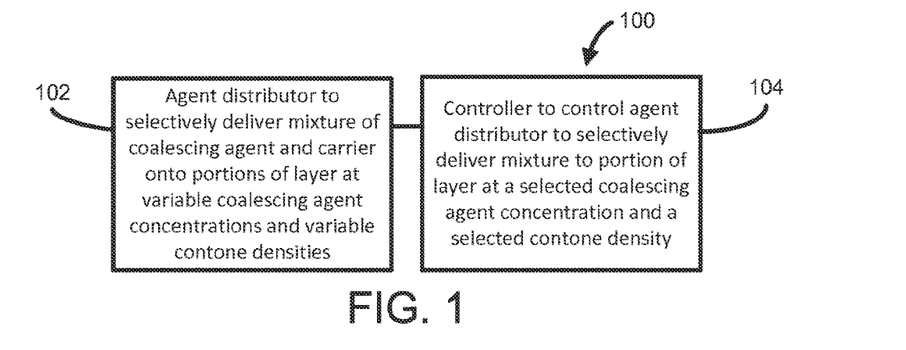
FIG. 1 illustrates a system for generating a three-dimensional object according to some examples.

FIG. 1 is a block diagram illustrating a system 100 for generating a three-dimensional object according to some examples. The system 100 may include at least one agent distributor 102 which may be to selectively deliver mixtures of coalescing agent and carrier onto portions of a layer of build material at variable coalescing agent concentrations and variable contone densities. The system 100 may include a controller 104 which may be to control the at least one agent distributor to selectively deliver the mixture to a portion of the layer at a selected coalescing agent concentration and a selected contone density.

Figure 2:
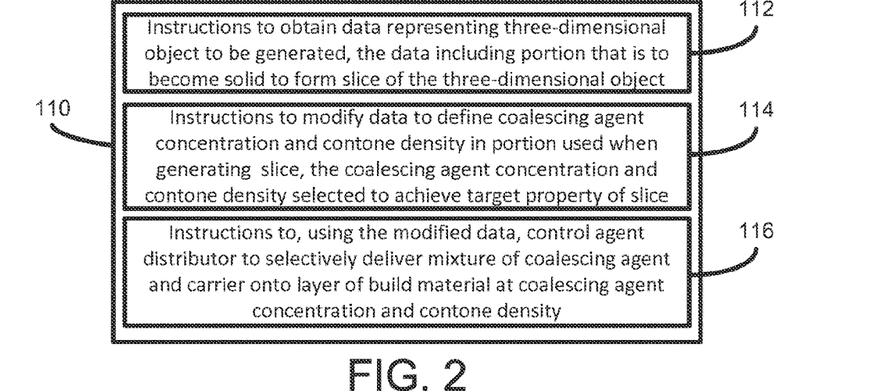
FIG. 2 is a block diagram illustrating a non-transitory computer readable storage medium according to some examples.

FIG. 2 is a block diagram illustrating a non-transitory computer readable storage medium 110 according to some examples. The non-transitory computer readable storage medium 110 may include instructions 112 that, when executed by a processor, cause the processor to obtain data representing a three-dimensional object to be generated, the data including a portion that is to become solid to form at least one slice of the three-dimensional object. The non-transitory computer readable storage medium 110 may include instructions 114 that, when executed by the processor, cause the processor to modify the data to define a coalescing agent concentration and contone density in the portion to be used when generating the slice, the coalescing agent concentration and the contone density selected to achieve a target property of the least one slice. The non-transitory computer readable storage medium 110 may include instructions 116 that, when executed by the processor, cause the processor to, using the modified data, control at least one agent distributor to selectively deliver a mixture of coalescing agent and carrier onto a layer of build material at the coalescing agent concentration and the contone density.

Figure 3:
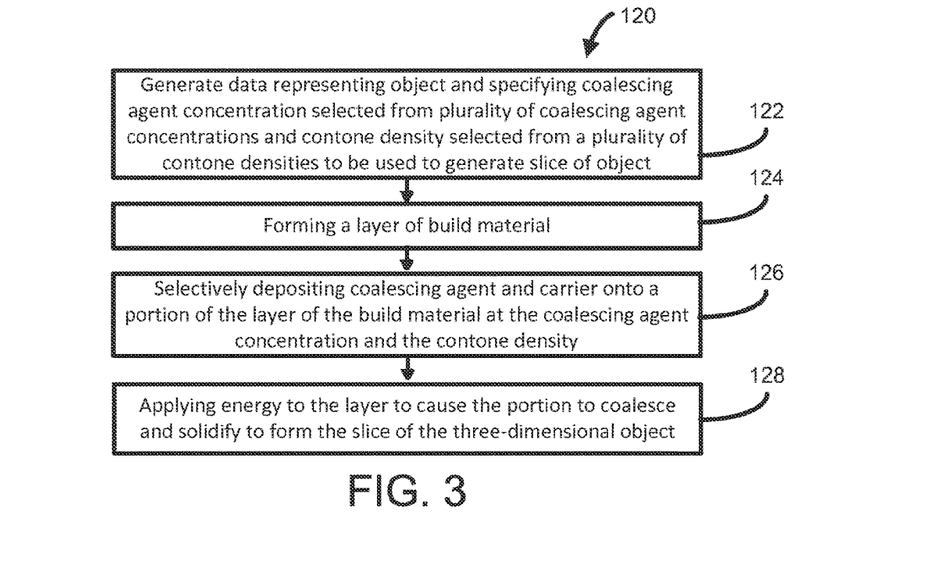
FIG. 3 is a flow diagram illustrating a method according to some examples.

FIG. 3 is a flow diagram illustrating a method 120 according to some examples. At 122, data may be generated representing a three-dimensional object to be generated. The data may specify a coalescing agent concentration selected from a plurality of coalescing agent concentrations and a contone density selected from a plurality of contone densities to be used to generate a slice of a three-dimensional object. At 124, a layer of build material may be formed. At 126, coalescing agent and carrier may be selectively deposited onto a portion of the layer of the build material at the coalescing agent concentration and the contone density. At 128, energy may be applied to the layer to cause the portion to coalesce and solidify to form the slice of the three-dimensional object.

Figure 4:
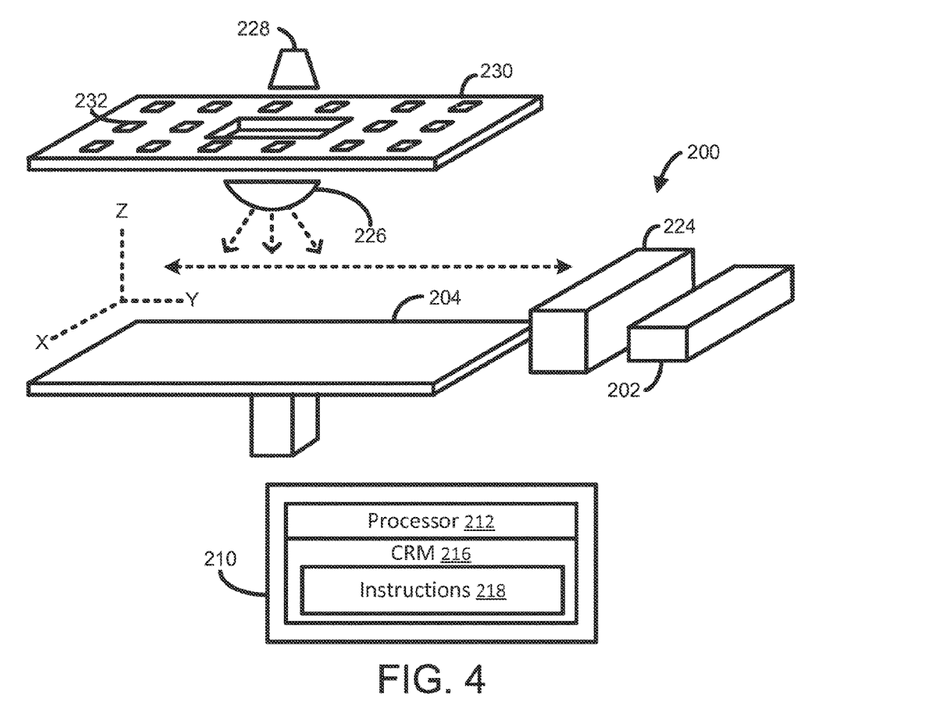
FIG. 4 is a simplified isometric illustration of an additive manufacturing system according to some examples.

FIG. 4 is a simplified isometric illustration of an additive manufacturing system 200 according to some examples. The system 200 may be operated as described further below with reference to the flow diagram of FIG. 5 to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powdered ceramic materials, powdered glass materials, powdered resin material, powdered polymer materials, and the like, and combinations thereof. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material.

The additive manufacturing system 200 may include a system controller 210. Any of the operations and methods disclosed herein (e.g. in FIG. 5) may be implemented and controlled in the additive manufacturing system 200 and/or controller 210. The controller 210, as understood herein, comprises (1) a non-transitory computer-readable storage medium comprising instructions to perform operations and methods disclosed herein, and a processor coupled to the non-transitory computer-readable storage medium to execute the instructions or (2) circuitry to perform the operations and methods disclosed herein.

The controller 210 may include a processor 212 for executing instructions that may implement the methods described herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The processor 212 may be in communication with a computer-readable storage medium 216, e.g. via a communication bus. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any of the methods or operations disclosed herein according to various examples. In other examples, the controller 210 may not include a computer-readable storage medium 216, and the processor may comprise circuitry to perform any of the methods or operations disclosed herein without executing separate instructions in a computer-readable storage medium.

The system 200 may include a coalescing agent distributor 202 to selectively deliver to successive layers of build material formed on a support member 204, mixtures comprising a coalescing agent, carrier, and/or a colorant. The controller 210 may control the selective delivery of mixtures comprising coalescing agent to a formed layer of build material in accordance with the instructions 218. The agent distributor 202 may be a printhead, such as a thermal inkjet printhead or a piezo inkjet printhead. The printhead may have arrays of nozzles. In some examples, the agent distributor 202, e.g. nozzles of a printhead, may be used to selectively deliver, e.g. eject, drops of mixtures comprising coalescing agent. In one example, printheads such as those commonly used in commercially available inkjet printers may be used. In other examples, the agents may be delivered through spray nozzles rather than through printheads. Other delivery mechanisms may be used as well. In some examples the printheads may be drop-on-demand printhead. In other examples the printhead may be continuous drop printhead.

In some examples, the agent distributor 202 may be an integral part of the system 200. In some examples, the agent distributor 202 may be user replaceable, in which case they may be removably insertable into a suitable agent distributor receiver or interface module of the system 200.

In the example illustrated in FIG. 4, the agent distributor 202 may have a length that enables it to span the whole width of the support member 204 in a so-called page-wide array configuration. In one example this may be achieved through a suitable arrangement of multiple printheads. In other examples a single printhead having an array of nozzles having a length to enable them to span the width of the support member 204 may be used. In other examples, the agent distributor 202 may have a shorter length that does not enable it to span the whole width of the support member 204.

The agent distributor 202 may be mounted on a moveable carriage to enable it to move bi-directionally across the length of the support 204 along the illustrated y-axis. This enables selective delivery of mixtures comprising coalescing agent across the whole width and length of the support 204 in a single pass. In other examples the agent distributor 202 may be fixed, and the support member 204 may move relative to the agent distributor 202.

In other examples the agent distributor may be fixed, and the support member 204 may move relative to the agent distributor.

It should be noted that the term 'width' used herein is used to generally denote the shortest dimension in the plane parallel to the x and y axes illustrated in FIG. 4, whilst the term 'length' used herein is used to generally denote the longest dimension in this plane. However, it will be understood that in other examples the term 'width' may be interchangeable with the term 'length'. For example, in other examples the agent distributor 202 may have a length that enables them to span the whole length of the support member 204 whilst the moveable carriage may move bi-directionally across the width of the support member 204.

In another example the agent distributor 202 does not have a length that enables it to span the whole width of the support member but are additionally movable bi-directionally across the width of the support member 204 in the illustrated x-axis. This configuration enables selective delivery of coalescing agent across the whole width and length of the support 204 using multiple passes. Other configurations, however, such as a page-wide array configuration, may enable three-dimensional objects to be created faster.

According to non-limiting examples, the coalescing agent may be provided in a mixture with a carrier (e.g. liquid carrier), such as water or any other suitable solvent or dispersant, to enable the coalescing agent to be delivered via a printhead. In some examples, the mixture may also include a colorant.

In some examples, a suitable mixture comprising coalescing agent, carrier, and/or color may be an ink-type formulation. A suitable coalescing agent may be carbon black, such that the mixture may, for example, be the ink formulation commercially known as CM997A available from Hewlett-Packard Company. In examples, such an ink may comprise a coalescing agent such as infra-red light absorber. In one example such an ink may additionally comprise a coalescing agent such as a near infra-red light absorber. In examples, such an ink may additionally comprise a coalescing agent such as a visible light absorber. In one example such an ink may additionally comprise a coalescing agent such as a UV light absorber. Examples of inks comprising coalescing agents such as visible light enhancers may be dye based colored ink and pigment based colored ink, such as inks commercially known as CM993A and CE042A available from Hewlett-Packard Company.

In some examples, a colorant in the mixture may be a dye or pigment. For example, the colorant may include a cyan (C), magenta (M), yellow (Y), or black (K) colorant according to a subtractive color model. However, in some examples, the mixture may not include a colorant.

Thus, in some examples, the agent distributor 202, e.g. nozzles of a printhead, may be used to selectively deliver, e.g. eject, the mixture of the coalescing agent, carrier, and/or colorants.

In some examples, the mixture of coalescing agent, carrier, and/or colorant may include a coalescing agent concentration (percentage) of coalescing agent, by mass, of between about 0.1% and about 10%, or between about 0.5% and about 5%. Thus, each drop may have a percentage of coalescing agent in the aforementioned range. However, in other examples, a different concentration of coalescing agent in the mixture outside of the aforementioned range may be used. In some examples, the agent distributor 202 is able to deliver drops of different mixtures with variable (e.g. different) mass concentrations of coalescing agents.

In some examples, each drop may be in the order of about 10 pico liters (pl) per drop, and may have a mass of about 5 nanograms to about 20 nanograms. However, in other examples, the agent distributor 202 is able to deliver a higher or lower drop volume and drop mass. In some examples the agent distributor 202 is able to deliver drops with variable volumes and masses.

In some examples, the agent distributor 202 may be to selectively deliver drops of the mixture having coalescing agent at variable (e.g. different) contone densities. For example, the contone densities may be between about 0.25 to about 4 drops, or between about 0.5 to about 2 drops (e.g. 0.5 drops, 1 drop, or 1.5 drops, or 2 drops) per 600 dpi (dots per inch) i.e. $\frac{1}{600} \times \frac{1}{600}$ inch region ($\frac{1}{360,000}$ square inches). In other examples, the agent distributor 202 may be to deliver drops of the mixture at higher or lower contone densities.

The coalescing agent distributor 202 may include a supply of mixtures comprising coalescing agent or may be connectable to a separate supply of mixtures comprising coalescing agent.

In some examples, there may be any number of additional agent distributors relative to the distributors shown in FIG. 4. Any additional agent distributors may have similar features as those discussed earlier with reference to the coalescing agent distributor 202. However, in some examples, different agent distributors may deliver mixtures comprising different coalescing agents and/or coalescence modifier agents, for example. For example, different coalescing agent distributors may be provided to deliver drops with different colorants, e.g. a first agent distributor may be to deliver a first mixture of coalescing agent, liquid carrier, and cyan (C) colorant, a second agent distributor may be to deliver a second mixture of coalescing agent, liquid carrier, and magenta (M) colorant, a third agent distributor may be to deliver a third mixture of coalescing agent, carrier, and yellow (Y) colorant, and a fourth agent distributor may be to deliver a fourth mixture of coalescing agent, carrier, and black (K) colorant. In some examples, different coalescing agent distributors may be provided to deliver drops at different coalescing agent concentrations, for example ranging from between about 0.1% to about 10%, or between about 0.5% to about 5%. In some examples, a first agent distributor may be to deliver drops of a first mixture having a mass concentration of coalescing agent of 1%, a second agent distributor may be to deliver drop of a second mixture having a mass concentration of coalescing agent of 2%, a third agent distributor may be to deliver drops of a second mixture having a mass concentration of coalescing agent of 3%, and a fourth agent distributor may be to deliver drops of a fourth mixture having a mass concentration of coalescing agent of 4%. In some examples, a single agent distributor may include first nozzles to deliver the first mixture, second nozzles to deliver the second mixture, third nozzles to deliver the third mixture, and fourth nozzles to deliver the fourth mixture. Therefore, a single agent distributor may be to deliver different mixtures with variable coalescing agent concentrations. In some examples, a single agent distributor may be connected to multiple supplies each containing mixtures having different coalescing agent concentrations, and may be to deliver any the mixtures at any of the coalescing agent concentrations. In some examples, different agent distributors, or different nozzles of a single agent distributor, may also be used for delivering different sized drops or delivering drops at different contone densities.

In some examples, the agent distributors of system 200 may be located on the same carriage, either adjacent to each other or separated by a short distance. In other examples, multiple carriages may contain the distributors. For example, each distributor may be located in its own separate carriage.

The system 200 may further comprise a build material distributor 224 to form successive layers of build material on the support member 204. Suitable build material distributors 224 may include, for example, a wiper blade and a roller. Build material may be supplied to the build material distributor 224 from a hopper or build material store. In the example shown the build material distributor 224 moves across the length (y-axis) of the support member 204 to form a layer of build material. As previously described, a layer of build material will be formed on the support member 204, whereas subsequent layers of build material will be formed on a previously deposited layer of build material. The build material distributor 224 may be a fixed part of the system 200, or may not be a fixed part of the system 200, instead being, for example, a part of a removable module. In some examples, the build material distributor 224 may be mounted on a carriage.

In some examples, the thickness of each layer may have a value selected from the range of between about 50 to about 300 microns, or about 90 to about 110 microns, or about 250 microns, although in other examples thinner or thicker layers of build material may be provided. The thickness may be controlled by the controller 210, for example based on the instructions 218.

In the example shown the support 204 is moveable in the z-axis such that as new layers of build material are deposited a predetermined gap is maintained between the surface of the most recently deposited layer of build material and lower surface of the agent distributor 202. In other examples, however, the support 204 may not be movable in the z-axis and the agent distributor 202 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage.

In other examples, the energy source 226 may apply a variable amount of energy as it is moved across the layer of build material, for example in accordance with instructions 218. For example, the controller 210 may control the energy source to apply energy to portions of build material on which coalescing agent has been applied but to portions of build material on which coalescing agent has not been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material. For example, the laser beam may be controlled to apply energy to those portions of a layer of on which coalescing agent is delivered.

The combination of the energy supplied, the build material, and the coalescing agent may be selected such that: i) portions of the build material on which no coalescing agent have been delivered do not coalesce when energy is temporarily applied thereto; ii) portions of the build material on which coalescing agent has been delivered or has penetrated coalesce when energy is temporarily applied thereto do coalesce.

The system 200 may additionally include a heater 230 to emit heat to maintain build material deposited on the support 204 within a predetermined temperature range. The heater 230 may have any suitable configuration. The heater 230 may have an array of heating units 232, as shown in FIG. 4. The heating units 232 may be each be any suitable heating unit, for example a heat lamp such as an infra-red lamp. The heating units 232 may have any suitable shapes or configurations such as rectangular as shown in FIG. 4. In other examples they may be circular, rod shaped, or bulb shaped, for example. The configuration may be optimized to provide a homogeneous heat distribution toward the area spanned by the build material. Each heating unit 232, or groups of heating units 232, may have an adjustable current or voltage supply to variably control the local energy density applied to the build material surface.

Each heating unit 232 may correspond to its own respective area of the build material, such that each heating unit 232 may emit heat substantially toward its own area rather than areas covered by other heating units 232. For example, each of the sixteen heating units 232 may heat one of sixteen different areas of the build material, where the sixteen areas collectively cover the entire area of the build material. However, in some examples, each heating unit 232 may also emit, to a lesser extent, some heat which influences an adjacent area.

The system 200 may additionally include a sensor 228 for detecting temperature, for example a point contactless temperature sensor such as a thermopile, or such as a thermographic camera. In other examples, the sensor 229 may include an array of fixed-location pyrometers which each capture radiation from a single area of the build material. In other examples, the sensor 229 may be a single pyrometer which may be operable to sweep or scan over the entire area of the build material. Other types of sensors may also be used.

The sensor 228 may be to capture a radiation distribution, for example in the IR range, emitted by each point of the build material across the area spanned by the build material on the support member 204. The sensor 228 may output the radiation distribution to the controller 210, which may determine a temperature for each area across the build material based on known relationships, such as a black body distribution, between temperature and radiation intensity for the material used as the build material. For example, the radiation frequencies of the radiation distribution may have their highest intensities at particular values in the infra-red (IR) range. Each temperature may correspond to a particular area of the build material, wherein each of the areas collectively define an entire area of the build material print bed.

The sensor 228 may be oriented generally centrally and facing generally directly toward the build material, such that the optical axis of the camera targets the center line of the support member 204, to allow a generally symmetric capture of radiation from the build material. This may minimize perspective distortions of the build material surface, thus minimizing the need for corrections, and reducing errors in measured temperature values versus real temperature values. Additionally, the sensor 228 may be able to (1) capture the image over a wide region covering an entire layer of build material, for example by using suitable magnification, (2) capture a series of images of the entire layer which are later averaged, or (3) capture a series of images each covering a portion of the layer that together cover the entire layer. In some examples, the sensor 228 may be in a fixed location relative to the support member 204, but in other examples may be moveable if other components, when moving, disrupt the line of sight between the sensor 228 and the support member 204.

In some examples, an array of sensors 228 may be used. Each sensor 228 may correspond to its own respective area of the build material, such that each sensor 228 may perform measurements on its own area rather than areas corresponding to other sensors 228.

Figure 5:
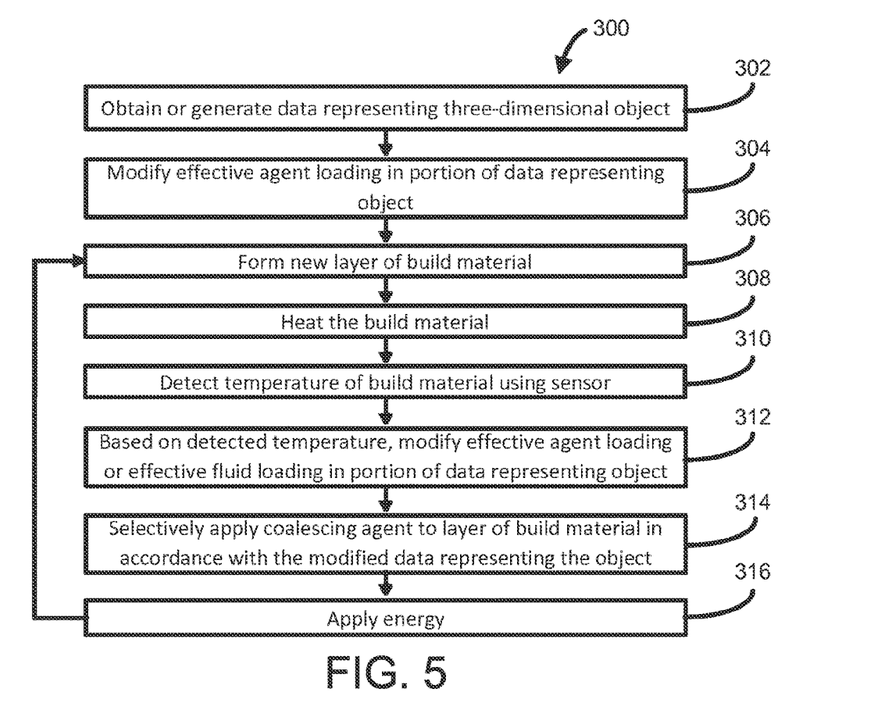
FIG. 5 is a flow diagram illustrating a method of generating a three-dimensional object according to some examples.

FIG. 5 is a flow diagram illustrating a method 300 of generating a three-dimensional object according to some examples. In some examples, the orderings shown may be varied, some elements may occur simultaneously, some elements may be added, and some elements may be omitted.

Figure 6A:
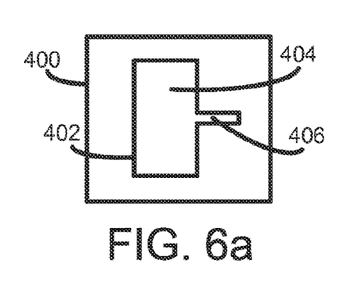
FIG. 6a shows data representing a three-dimensional object according to some examples.
Figure 6B:
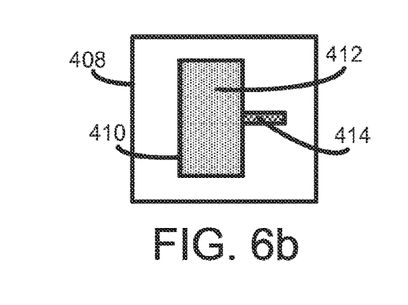
FIG. 6b shows modified data representing a three-dimensional object according to some examples.
Figure 7A:
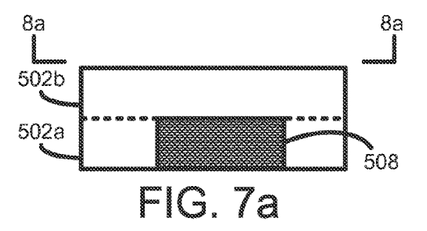
FIGS. 7a-d show a series of cross-sectional side views of layers of build material according to some examples.
Figure 7B:
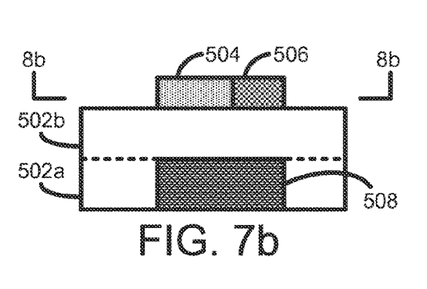
Figure 7C:
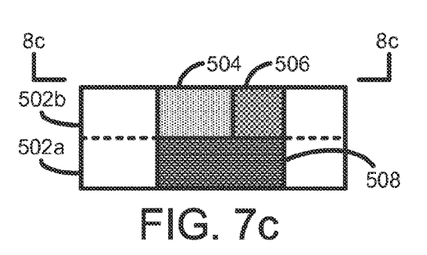
Figure 7D:
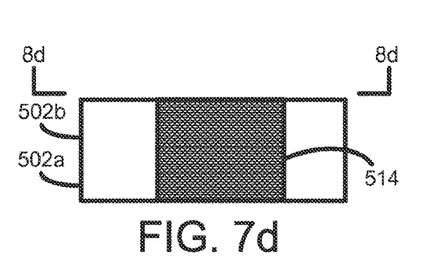
Figure 8A:
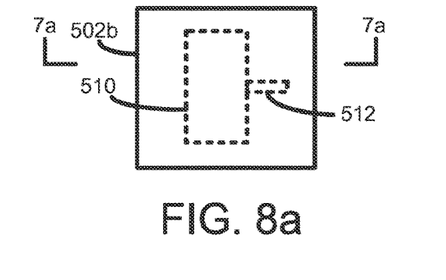
FIGS. 8a-d show a series of top views of layers of build material according to some examples.
Figure 8B:
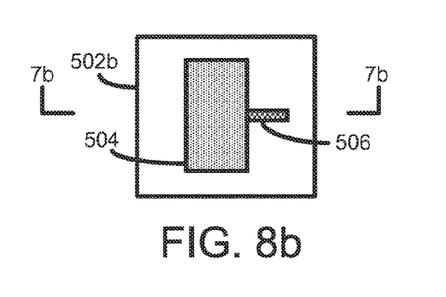
Figure 8C:
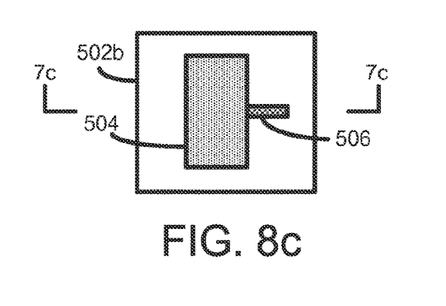
Figure 8D:
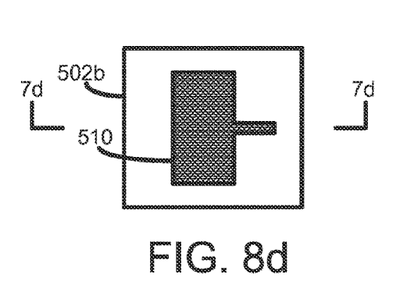

In describing FIG. 5, reference will be made to FIGS. 4, 6a-b, 7a-d, and 8a-d. FIG. 4 shows data representing a three-dimensional object according to some examples. FIG. 6a shows data representing a three-dimensional object according to some examples. FIG. 6b shows modified data representing a three-dimensional object according to some examples. FIGS. 7a-d show a series of cross-sectional side views of layers of build material according to some examples. FIGS. 8a-d show a series of top views of layers of build material according to some examples. A top view of layers along line 8a-8a of FIG. 7a is shown in FIG. 8a, and a cross sectional side view along lines 7a-7a of FIG. 8a is shown in FIG. 7a. A top view of layers along line 8b-8b of FIG. 7b is shown in FIG. 8b, and a cross sectional side view along lines 7b-7b of FIG. 8b is shown in FIG. 7b. A top view of layers along line 8c-8c of FIG. 7c is shown in FIG. 8c, and a cross sectional side view along lines 7c-7c of FIG. 8c is shown in FIG. 7c. A top view of layers along line 8d-8d of FIG. 7d is shown in FIG. 8d, and a cross sectional side view along lines 7d-7d of FIG. 8a is shown in FIG. 7d.

At 302, data 400 representing the three dimensional object may be generated or obtained by the controller 210. "Data representing the three dimensional object" is defined herein to include any data defining the object from its initial generation as three dimensional object design data to its conversion into slice data representing slices of the object to be generated. The data 400 may be part of the instructions 218.

The three-dimensional object design data may represent a three-dimensional model of an object to be generated, and/or properties of the object (e.g. density, surface roughness, strength, and the like). The model may define the solid portions of the object. The three-dimensional object design data may be received, for example, from a user via an input device 220, as input from a user, from a software driver, from an application such as a computer aided design (CAD) application, or may be obtained from a memory storing default or user-defined object design data and object property data. The three-dimensional object design data may be processed by a three-dimensional object processing system to generate slice data representing slices of parallel planes of the model.

Each slice may define a portion of a respective layer of build material that is to be solidified by the additive manufacturing system. The slice data may undergo transformations from (1) vector slice data representing slices of the object in a vector format, to (2) contone slice data representing slices of the object in a bitmap or rasterized format, to (3) halftone slice data representing locations, portions, or patterns in which drops of agent are to be deposited on a layer of build material for each slice of the object, to (4) mask slice data representing the timing of when drops of agent are to be deposited in locations, portions, or patterns on a layer of build material for each slice of the object, e.g. using nozzles of an agent distributor.

In the example of FIG. 6a, an example of data 400 is shown as slice data defining a slice 402 that is to become solid to form part of the three-dimensional object being generated using coalescing agent. The slice 402 may include a thick portion 404. A thick portion is a portion that does not have a thickness across its axes (e.g. width or length) that is less than a threshold thickness. The slice 402 may include a thin portion 406. A thin portion is a portion that has a thickness across at least one axis (e.g. width or length) that is below the threshold thickness. In some examples, the threshold thickness may be 2 millimeters, or may be 1 millimeter.

Initially, the slice 402 may include a default setting or initial determination of coalescing agent concentrations and contone densities for the thick portion 404 and the thin portion 406. In some examples, these settings may be the same for the thick portion 404 and the thin portion 406, but in other examples they may initially be different.

However, in some examples, thin portions of slices may be more susceptible to under-solidification compared to thicker portions of slices due to heat dissipation from the thin portion to surrounding build material.

At 304, in some examples, the data 400 may therefore be modified into data 408 and slice 410 of FIG. 6b to reflect modified coalescing agent concentrations and/or modified contone densities. In some examples, the controller 210 may determine a coalescing agent loading and/or fluid loading for each of the modified portions 412 and 414 so as to achieved target object properties, for example, mechanical strength, density, or color of the object.

In some examples, a first coalescing agent concentration and a first contone density (and in some examples, a first modified coalescing agent loading and/or a first fluid loading) may be used in modified thick portion 412, and a second, different coalescing agent concentration and a second, different contone density (and in some examples, a second modified coalescing agent loading and/or a second modified fluid loading) may be used in the thin portion 414, as shown in FIG. 6b. In some examples, the second modified coalescing agent loading may be greater than the first modified coalescing agent loading, for example because a greater coalescing agent loading may be used in the thin portion 414 to produce similar part strength or density as in the thick portion 412.

In some examples, the first and second coalescing agent concentrations and the first and second contone densities may be modified such that the coalescing agent loadings and/or fluid loadings are kept constant after modification. For example, a higher modified value for a coalescing agent concentration but lower modified value for a contone density may allow a coalescing agent loading to retain the same value as before modification. However, by performing such a modification, increased coalescence may be achieved because, for example, the overall amount of coalescing agent (and therefore the degree of coalescence effect due to coalescing agent) used may be kept relatively constant while the overall amount of carrier fluid, which may cause a cooling effect on build material that counteracts coalescence, may be reduced.

In some examples, the colorant in the mixtures of coalescing agent, carrier, and/or colorant used may affect the degree of coalescence and solidification. For example, the colorant may act as energy absorber. Therefore, the values of the selected coalescing agent loadings, coalescing agent concentrations, and/or contone densities to be used for generating a portion of an object may depend on the particular colorant that is to be used for generating that portion of the object.

In some examples, varying the coalescing agent concentration and/or contone density may impact the object's external appearance, such as the color of the object. For example, a reduced contone density may cause less colorant to be provided to the build material, causing a change in the appearance, e.g. color, of the object.

Although the example of data 400 is shown, in other examples other types of data may be modified at 304 including three-dimensional object design data or any other type of slice data. In addition, if slice data is processed at 304, then all slice data (representing multiple slices of the object) of a print job may be processed.

As discussed earlier, the halftone slice data and the mask slice data may represent locations, portions, or patterns in which drops of agent are to be deposited, whereas the three-dimensional object design data, vector slice data, and contone slice data may not explicitly define locations, portions, or patterns in which drops of agent are to be deposited. The modification of data 400 is therefore meant to encompass modifications of agent delivery data as represented in halftone slice data or the mask slice data, or modifications of precursors of agent delivery data that are represented in the three-dimensional object design data, vector slice data, or contone slice data.

As discussed earlier, if slice data is processed at 302 to 304, the processing of 302 to 304 may be performed for all slice data (representing multiple slices of the objet) of a print job. In some examples, slice data representing separate slices may be processed during printing in 306 to 316, e.g. slice data representing the particular slice to be printed in the particular iteration of 306 to 316 may be processed e.g. before applying the coalescing agent at 314.

At 306, a layer 502b of build material may be formed, as shown in FIGS. 7a and 8a. For example, the controller 210 may control the build material distributor 224 to form the layer 502b on a previously completed layer 502a on the support member 204 by causing the build material distributor 224 to move along the y-axis as discussed earlier. The completed layer 502a may include a solidified portion 508. Although a completed layer 502a is shown in FIGS. 7a-d for illustrative purposes, it is understood that 306 to 316 may initially be applied to generate the first layer 502a.

At 308, in some examples, after applying the layer 502b, the layer 502b of build material may be heated by the heater 230 to heat and/or maintain the build material within a predetermined temperature range. The predetermined temperature range may, for example, be below the temperature at which the build material would experience bonding in the presence of coalescing agent. For example, the predetermined temperature range may be between about 155 and about 170 degrees Celsius, or the range may be centered at about 160 degrees Celsius. Pre-heating may help reduce the amount of energy that has to be applied by the energy source 226 to cause coalescence and subsequent solidification of build material on which coalescing agent has been delivered or has penetrated.

At 310, a property of the layer 502b may be detected and/or obtained. An example property may include temperatures of different portions of the layer 502b of build material. The temperatures may be based on feedback obtained by the sensor 228, for example by capturing an image representing a radiation distribution of the build material as discussed earlier. The measured radiation distribution may be used by the controller 210 or by a processor in the sensor 228 to determine the reference temperature distribution over time for each area across the build material based on known relationships, such as a black body distribution, between temperature and radiation intensity for the material used as the build material, as discussed earlier. For each area, this may be used to determine a temperature. Each determined temperature may correspond to a particular area of the build material, wherein each of the areas collectively define an entire area of the build material print bed.

In some examples, portions 510 and 512 of the layer 502b may be identified as having unexpected temperatures. Portions 510 and 512 are respectively be above a thick portion and a thin portion of solidified portion 508 of the previously processed layer 502a.

In some examples, portion 510 may be identified as having e.g. a higher temperature than expected, e.g. because the upon application of energy to solidify portion 508, a large amount of energy may have been absorbed by the thick portion of solidified portion 508 due to the thickness of the thick portion, and may have formed a heat reservoir which has penetrated into the portion 510 of newly delivered layer 502a.

In some examples, portion 512 may be identified as having e.g. a lower temperature than expected, e.g. because the upon application of energy to solidify portion 508, energy absorbed in the thin portion may have flowed away from the thin portion due to the thinness of the thin portion. Thus, a small amount of energy may have penetrated into the portion 512 to a degree that is less than expected.

For example, due to the unexpected temperatures, an incorrect degree of solidification or incorrect object properties relative to specifications in the object design data may be achieved in the layer 502b if modification is not made to the slice data representing the layer 502b. For example, upon delivery of coalescing agent and application of energy, and in the absence of modification to the slice data, over-solidification to a degree greater than intended may occur in portion 510, and under-solidification to degree lesser than intended may occur in portion 512.

In some examples, the portions 510 and 512 may also have temperatures that are unexpected due to an unexpected degree of a cooling effect of the carrier in the mixtures delivered to the previous layer 502a. A greater than expected cooling effect may lead to under-solidification, and a lesser than expected cooling effect may lead to over-solidification.

In some examples, the unexpected temperatures may occur because the initial modification of data 400 to modified data 408 at 304 may not have been performed, and therefore these heat flow or cooling effects may not yet have been corrected for. In other examples, even where such modification was performed at 304, these heat flow effects and cooling effects may not have been sufficiently anticipated. Therefore, in any of these examples, further modification of slice data may be performed. In particular, a modification to the slice data representing layer 502b may be performed in a similar manner as the modification of data 400 to modified data 408 described earlier at 304. For example, the controller 210 may determine a coalescing agent loading for each of the modified portions 412 and 414 (corresponding to portions 510 and 512 of layer 502b) so as to achieve desired object properties. In some examples, a first coalescing agent concentration and a first contone density (and in some examples, a first modified coalescing agent loading and/or a first modified fluid loading) may be used in modified thick portion 412, and a second, different coalescing agent concentration and a second, different contone density (and in some examples, a second modified coalescing agent loading and/or a second modified fluid loading) may be used in the thin portion 414, as shown in FIG. 6b. In some examples, the second modified coalescing agent loading may be greater than the first modified coalescing agent loading, for example because a greater coalescing agent loading may be used in the thin portion 414 to produce similar part strength or density as in the thick portion 412.

In some examples, as discussed earlier, the values of the selected coalescing agent loadings, coalescing agent concentrations, and/or contone densities to be used for generating a portion of an object may depend on the particular colorant that is to be used for generating that portion of the object.

In other examples using sensors other than temperature sensors, unexpected properties other than temperature may be detected. Based on the detection of such a property, slice data may be modified as described earlier to achieve desired object properties.

At 314, a first mixture 504 of coalescing agent, carrier, and/or colorant may be selectively delivered at a first coalescing agent concentration and at a contone density in a pattern to the surface of portions of the layer 502b in accordance with thick portion 412 of modified data 408, as shown in FIGS. 7b and 8b. Additionally, a second mixture 506 of coalescing agent, carrier, and/or colorant may be selectively delivered at a first coalescing agent concentration and at a contone density in a pattern to the surface of portions of the layer 502b in accordance with thin portion 414 of modified data 408, as shown in FIGS. 7b and 8b. In examples, to form the slice the mixtures 504 and 506 are to be delivered at coalescing agent densities and contone densities sufficient to cause a desired level of coalescence and solidification of build material upon application of energy, e.g. due to the coalescing agent acting as an absorber of applied energy to facilitate the coalescence and solidification.

As discussed earlier, the mixtures 504 and 506 may be delivered by the agent distributor 202, for example in the form of fluids such as liquid droplets. "Selective delivery" means that mixtures having coalescing agent may be delivered to selected portions of the surface layer of the build material in various patterns.

In some examples, mixtures based on instructions 218 from the controller 212, the particular agent distributors, nozzles, or supplies to be used may be selected that are suitable for delivery of the mixtures 504 and 506. As discussed earlier, particular agent distributors, particular nozzles of single agent distributors, and/or particular supplies of mixtures, may be selected that are suitable for delivering mixtures having selected coalescing agent concentrations and contone densities.

FIGS. 7c and 8c show coalescing agent (and/or carriers and colorants) of the mixtures 504 and 506 having penetrated substantially completely into the portions of the layer 502b of build material, but in other examples, the degree of penetration may be less than 100%. The degree of penetration may depend, for example, on the quantity of agent delivered, on the nature of the build material, on the nature of the agent, etc.

At 314, a predetermined level of energy may be temporarily applied to the layer 502b of build material. In various examples, the energy applied may be infra-red or near infra-red energy, microwave energy, ultra-violet (UV) light, halogen light, ultra-sonic energy, or the like. In some examples, the energy source may be focused. In other examples, the energy source may be unfocused. The temporary application of energy may cause the portions of the build material on which the mixtures 504 and 506 having coalescing agent were delivered to heat up above the melting point of the build material and to coalesce. For example, the temperature of some or all of the layer 502b may achieve about 220 degrees Celsius. Upon cooling, the portions having mixtures 504 and 506 having coalescing agent may coalesce and may become solid to form part of the three-dimensional object being generated, as shown in FIG. 7d and FIG. 8d.

As discussed earlier, one such solidified portion 508 may have been generated in a previous iteration. The heat absorbed during the application of energy may propagate to the previously solidified portion 508 to cause part of portion 508 to heat up above its melting point. This effect helps creates a portion 514 that has strong interlayer bonding between adjacent layers of solidified build material, as shown in FIG. 7d. The portion 514 may also achieve good object properties such as good surface properties, accuracy, strength, cosmetic appearance such as color, and interlayer bonding, as a result of suitable concentrations and contone densities of coalescing agent.

After a layer of build material has been processed as described above in 306 to 316, new layers of build material may be provided on top of the previously processed layer of build material. In this way, the previously processed layer of build material acts as a support for a subsequent layer of build material. The process of 306 to 316 may then be repeated to generate a three-dimensional object layer by layer.

In an example to test some of the techniques disclosed herein, it was found that as shown in Table 1, using a greater coalescing agent concentration while keeping contone density constant (such that coalescing agent loading was much greater and fluid loading slightly lower) resulted in generating an object with greater part density (and therefore greater mass), resulting in greater mechanical strength. This may, for example, have resulted due to increased absorbance by coalescing agent leading to a greater degree of coalescence and solidification of build material, and due to slightly reduced cooling effect due to less carrier fluid in delivered mixtures of coalescing agent, carrier fluid, and/or colorant, thereby reducing the carrier fluid's cooling effect. The cooling effect, as discussed earlier, may reduce the degree of coalescence and solidification.

TABLE 1

|  | Coalescing Agent Concentration | Contone Density (drops per 600 dpi) | Coalescing Agent Loading | Fluid Loading | Fusing Speed (inches per sec) | Part Weight (grams) |
| --- | --- | --- | --- | --- | --- | --- |
| Before Data Modification | 2% | 1 | 1.28 | 62.73 | 30-20 | 1.35 |
| After Data Modification | 3% | 1 | 1.92 | 62.08 | 30-20 | 1.60 |

In an example to test some of the techniques disclosed herein, it was found that as shown in Table 2, using a greater coalescing agent concentration while reducing contone density (such that coalescing agent loading was held constant and fluid loading was much greater) also resulted in generating an object with greater part density (and therefore greater mass), resulting in greater mechanical strength. This may, for example, have resulted due to less carrier fluid in delivered mixtures of coalescing agent, carrier, and/or colorant, thereby reducing the carrier's cooling effect. Meanwhile, the overall amount of coalescing agent used is held constant as reflected in the constant coalescing agent loading, therefore the effect of coalescence and solidification by the coalescing agent may also be held constant.

TABLE 2

|  | Coalescing Agent Concentration | Contone Density (drops per 600 dpi) | Coalescing Agent Loading | Fluid Loading | Fusing Speed (inches per sec) | Part Weight (grams) |
| --- | --- | --- | --- | --- | --- | --- |
| Before Data Modification | 2% | 0.75 | 0.96 | 47.04 | 30-15 | 1.50 |
| After Data Modification | 3% | 0.5 | 0.96 | 31.04 | 30-15 | 1.69 |

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. A system for generating a three-dimensional object, the system comprising:
at least one agent distributor to selectively deliver mixtures of coalescing agent and carrier onto portions of a layer of build material at variable coalescing agent concentrations and variable contone densities;
a fusing lamp to fuse portions of the layer of build material treated with the coalescing agent; and
a controller programmed to:
control the at least one agent distributor to selectively deliver coalescing agent at a selected coalescing agent concentration and a selected contone density based on heating effects of the coalescing agent concentration and cooling effects of the carrier.

2. The system of claim 1 wherein the coalescing agent concentration and the contone density are selected to achieve a target property of the three-dimensional object.

3. The system of claim 2 wherein the target property is a mechanical strength, density, or color of the three-dimensional object.

4. The system of claim 1 wherein the controller is programmed to determine the coalescing agent concentration and the contone density based on object design data representing the three-dimensional object before generating the three-dimensional object.

5. The system of claim 1 wherein the mixture includes a colorant, wherein the controller is programmed to determine the coalescing agent concentration and the contone density based on the colorant in the mixture.

6. The system of claim 1 wherein the controller is programmed to determine the coalescing agent concentration and the contone density based on a measured property of the layer while generating the three-dimensional object.

7. The system of claim 6, wherein the measured property is a temperature of the layer.

8. The system of claim 1 wherein the coalescing agent concentration is between about 0.1% and about 10%.

9. The system of claim 1 wherein the contone density is between about 0.5 to 2 drops of coalescing agent per 1/360000 square inches.

10. The system of claim 1 wherein the controller is programmed to modify data representing the three-dimensional object to represent the coalescing agent concentration and the contone density.

11. The system of claim 1 wherein the at least one agent distributor comprises different groups of nozzles, each group of nozzles to deliver a different mixture of coalescing agent and carrier with a corresponding coalescing agent concentration.

12. The system of claim 1, further comprising a thermal sensor to measure a temperature of the layer of build material.

13. The system of claim 12, wherein the thermal sensor is a camera.

14. The system of claim 1, further comprising a set of sixteen heaters to heat the layer of build material.

15. The system of claim 3, wherein the target property is density of the three-dimensional object.

16. The system of claim 1 wherein the agent distributor has a first operating mode in which a first mixture of colorant, coalescing agent, and carrier is selectively dispensed to the layer of build material;
   wherein the agent distributor has a second operating mode in which a second mixture of colorant, coalescing agent, and carrier is selectively dispensed to the layer of build material, and
   wherein a concentration of colorant in the first mixture and the second mixture is unchanged and concentrations of coalescing agent in the first and second mixture are different.

17. The system of claim 1, wherein the at least one agent distributor deposits multiple sizes of droplets.

18. The system of claim 1, comprising multiple agent distributors loaded with mixtures having different concentrations of coalescing agent.

19. The system of claim 1, wherein the controller is to determine a different coalescing agent loading for thinner portions of an object slice in the layer of build material compared to thicker portions.

20. A system for generating a three-dimensional object, the system comprising:
   at least one agent distributor to selectively deliver mixtures of coalescing agent and carrier onto portions of a layer of build material at variable coalescing agent concentrations and variable contone densities;
   a fusing lamp to fuse portions of the layer of build material treated with the coalescing agent; and
   a controller programmed to determine a coalescing agent loading by varying coalescing agent concentration and contone density, the controller to determine different coalescing agent loading for thinner portions of an object slice in the layer of build material compared to thicker portions.

* * * * *